United States Patent Office 3,540,888
Patented Nov. 17, 1970

3,540,888
PHOTOGRAPHIC SILVER HALIDE EMULSIONS CONTAINING DYES HAVING A 5-ALKOXYCARBONYL - 2,4 - DIOXO-1-ARYL-6-THIOXOPIPERIDENE MOIETY
John D. Mee, Rochester, N.Y., assignor to Eastman Kodak Company, Rochester, N.Y., a corporation of New Jersey
No Drawing. Filed Nov. 30, 1967, Ser. No. 686,787
Int. Cl. G03c 1/12
U.S. Cl. 96—139   22 Claims

ABSTRACT OF THE DISCLOSURE

Photographic silver halide emulsions are provided which contain a methine dye which features a 5-alkoxycarbonyl-2,4-dioxo-1-aryl-6-thioxopiperidine moiety.

---

This invention relates to novel photographic materials, and more particularly to a new class of methine dyes and intermediates therefor, to filter layers and photographic silver halide emulsions and elements prepared therewith, and to the preparation of these dyes and photographic elements.

Methine dyes derived from six-membered α,α-diketomethylene compounds, both carbocyclic and heterocyclic have been described. However, not all dyes of this general type are suitable for many photographic applications. For example, merocyanines and oxonols derived from 1,3-dialkyl barbituric acids and 5,5-dimethylcyclohexane-1,3-dione have been found to have little or no effect on photographic emulsions, and the oxonols have been suggested for use primarily in antihalation layers.

It is, accordingly, an object of this invention to provide a new class of methine dyes that confer improved characteristics to photographic silver halide emulsions and elements as compared with related prior art dyes. Another object of this invention is to provide photographic silver halide emulsions containing one or more of the novel dyes of the invention and photographic elements prepared therewith. Another object is to provide novel filter layers comprising a suitable hydrophilic colloid such as gelatin and at least one of the new dyes of the invention. Another object of this invention is to provide means for preparing the new class of dyes and novel photographic materials of the invention. Other objects of this invention will be apparent from this disclosure and the appended claims.

In accordance with this invention, a new class of methine dyes are provided which are derived from and contain a 5 - alkoxycarbonyl-2,4-dioxo-1-aryl-6-thioxopiperidine moiety.

In one embodiment of this invention, merocyanine dyes are provided which comprise first and second 5- to 6-membered nitrogen containing heterocyclic nuclei joined by a dimethine linkage; the first of said nuclei being a 5-alkoxycarbonyl-2,4-dioxo-1-aryl - 6 - thioxopiperidine nucleus joined at the 3-carbon atom thereof to said linkage; and said second nucleus being of the type used in preparing cyanine dyes, joined at a carbon atom thereof to said linkage, to complete said merocyanine dye.

In another embodiment of the invention, benzylidene dyes are provided which comprise two nuclei joined together by a monomethine or a trimethine linkage; the first of said nuclei being a 5-alkoxycarbonyl-2,4-dioxo-1-aryl-6-thioxopiperidine nucleus joined at the 3-carbon atom thereof to said linkage; and said second nucleus being a p-dialkylaminophenyl nucleus joined at the 4-carbon atom thereof to said nucleus, to complete said dye.

In still another embodiment of the invention, oxonol dyes are provided which comprise two 5-alkoxycarbonyl-2,4-dioxo-1-aryl-6-thioxopiperidine nuclei joined together at the 3-carbon atoms thereof by a monomethine or trimethine linkage.

In a further embodiment of the invention, allopolar carbocyanine dyes are provided which comprise first, second and third 5- to 6-membered nitrogen containing heterocyclic nuclei joined together by a trimethine linkage; the said first and said second nuclei being the same or different nuclei of the type used in preparing cyanine dyes, joined at carbon atoms thereof to the terminal carbon atoms of said linkage; and said third nucleus being a 5-alkoxycarbonyl-2,4-dioxo-1-aryl-6 - thioxopiperidine nucleus joined at the 3-carbon atom thereof to the meso carbon atom of said linkage, to complete said allopolar dye.

Typical useful dyes of this invention include the following:

(1) 5-Ethoxycarbonyl-3-[(3-ethyl-2-benzoxazolinylidene) ethylidene]-2,4-dioxo-1-phenyl-6-thioxopiperidine
(2) 5-Ethoxycarbonyl-3-[(3-ethyl - 2 - benzothiazolinylidene)ethylidene] - 2,4 - dioxo-1-phenyl-6-thioxopiperidine
(3) 3-[(3 - Ethyl-2-thiazolinylidene)ethylidene]-5-methoxycarbonyl-1-(1-naphthyl) - 2,4-dioxo-6-thioxopiperidine
(4) 3 - [(3-Ethyl-2-benzoselenazolinylidene)ethylidene]-2,4 - dioxo - 1 - phenyl - 5-propoxycarbonyl-6-thioxopiperidine
(5) 5-Butoxycarbonyl-2,4-dioxo-1-phenyl - 6 - thioxo - 3-[(1,3,3-trimethyl)-2-indolinylidene]piperidine
(6) 5-Ethoxycarbonyl - 3-[(1 - methyl - 2(1H)-quinolylidene) - ethylidene] - 2,4 - dioxo - 1 - phenyl-6-thioxopiperidine
(7) 5-Ethoxycarbonyl-3-[(1,3-dimethyl - 2-benzimidazolinylidene)ethylidene] - 2,4 - dioxo-1-phenyl-6-thioxopiperidine
(8) 5-Ethoxycarbonyl-3-[(1 - ethyl-2(1H)-pyridylidene)-ethylidene]-2,4-dioxo-1-phenyl-6-thioxopiperidine
(9) 3-(p-Dimethylaminobenzylidene)-5 - ethoxycarbonyl-2,4-dioxo-1-phenyl-6-thioxopiperidine
(10) 3-(p-Dimethylaminocinnamylidene) - 5 - ethoxycarbonyl-2,4-dioxo-1-phenyl-6-thioxopiperidine
(11) bis[5-Ethoxycarbonyl-2,4-dioxo-1-phenyl-6 - thioxopiperidine(3)]monomethine oxonol
(12) bis[5-Ethoxycarbonyl-2,4-dioxo-1-phenyl-6 - thioxopiperidine(3)]trimethine oxonol
(13) 3-bis{[(3-Ethyl - 2 - benzothiazolinylidene)methyl]-methylene} - 5 - ethoxycarbonyl-2,4-dioxo-1-phenyl-6-thioxopiperidine The new dyes of the invention include those represented by one of the following general formulas:

(I)

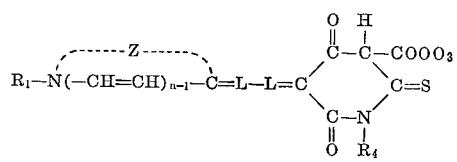

(II)

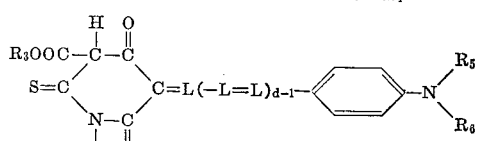

(III)

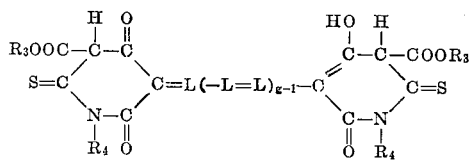

and (IV)

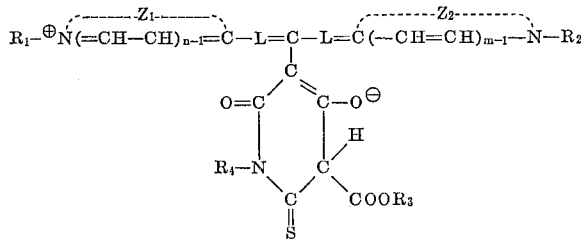

wherein n, m, d and g each represents a positive integer of from 1 to 2; L represents a methine linkage, e.g., =CH—, =C(CH$_3$)—, =C(C$_6$H$_5$)—, etc.; R$_1$ and R$_2$ each represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups, (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., an aralkyl group, e.g., benzyl, phenethyl, etc., or an aryl group, e.g., phenyl, tolyl, naphthyl, methoxyphenyl, chlorophenyl, etc.; R$_3$ represents an alkyl group (preferably a lower alkyl containing from 1 to 4 carbon atoms), e.g., methyl, ethyl, propyl, isopropyl, butyl, hexyl, cyclohexyl, decyl, dodecyl, etc.; R$_4$ represents an aryl group, e.g., phenyl, tolyl, naphthyl, methoxyphenyl, chlorophenyl, etc.; R$_5$ and R$_6$ each represents the same or different alkyl group (preferably a lower alkyl containing from 1 to 4 carbon atoms), e.g., methyl, ethyl, propyl, isopropyl, butyl, hexyl, cyclohexyl, decyl, dodecyl, etc.; and Z, Z$_1$ and Z$_2$ each represents the nonmetallic atoms necessary to complete the same or different sensitizing heterocyclic nucleus of the type used in cyanine dyes, containing from 5 to 6 atoms in the heterocyclic ring, which may also include, in addition to the hetero nitrogen atom, a second hetero atom such as oxygen, sulfur, selenium or nitrogen, such as the following nuclei: a thiazole nucleus, e.g., thiazole 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5 - methylbenzothiazole, 6 - methylbenzothiazole, 5 - bromobenzothiazole, 6 - bromobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5 - hydroxybenzothiazole, 6-hydroxybenzothiazole, naphtho[2,1-d]thiazole, naphtho[1,2-d]thiazole, β,β-naphtho[2,3-d]thiazole, 5 - methoxynaphtho[2,3-d]thiazole, 5 - ethoxynaphtho[1,2 - d]thiazole, 8 - methoxynaphtho[2,1 - d]thiazole, 7 - ethoxynaphtho[2,1-d]thiazole, 4 - methoxythianaphtheno-7',6',4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6 - methoxybenzoxazole, 5 - hydroxybenzoxazole, 6 - hydroxybenzoxazole, naphtho[2,1-d]oxazole, naphtho[1,2-d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc., a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4 - quinoline, 6 - methoxy - 4 - quinoline, 7-methyl-4-quinoline, 8-chloro-4-quinoline, 1-isoquinoline, 3,4-dihydro-1-isoquinoline, 3-isoquinoline, etc.; and, a 3,3-dialkylindolenine, nucleus, e.g., 3,3-dimethylindolenine, 3,3-dibutylindolenine, etc.; and, an imidazole nucleus e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-1H-naphth[2,1-d]imidazole, 1 - aryl - 3H - naphth[1,2-d] imidazole, 1 - alkyl-5-methoxy - 1H - naphth[2,1-d]imidazole, etc.; and the like.

The dyes of Formula I above are particularly useful as spectral sensitizers for negative silver halide emulsions; those of Formula II are primarily useful as filter dyes in photographic element layers; those of Formula III above function as electron acceptors (desensitizing dyes) and spectral sensitizers for direct positive silver halide emulsions; and those of Formula IV above are useful as filter dyes in photographic element layers and as components in supersensitizing combinations with various cyanine dyes. All of the above defined dyes have the additional advantage in that the proton in the 5-position of the thioxopiperidine nucleus is highly acidic, and dyes containing this nucleus can be solubilized by salt formation with strong bases. This permits ready removal of the dyes in alkaline developers, for example, in photographic applications wherein the dyes are used as filter dyes or as antihalation or antistatic backing layers. The oxonol dyes defined by Formula III above produce highly useful direct positive silver halide emulsions and elements. In addition, they are useful desensitizers in emulsions used in the process described in Stewart and Reeves, U.S. Pat. No. 3,250,618, issued May 10, 1966.

As used herein "desensitizing dyes" refers to those dyes which, when added to gelatin silver chlorobromide emulsion containing 40 mole percent chloride and 60 mole percent bromide, at a concentration of from 0.01 to 0.2 gram dye per mole of silver, caused by electron trapping at least about an 80 percent loss in the blue speed of the emulsion when sensitometrically exposed and developed three minutes in Kodak developer D-19 at room temperature. Advantageously, the desensitizing dyes are those which, when tested as just described, essentially completely desensitize the test emulsion to blue radiation (i.e., cause more than about 90 to 95% loss of speed to blue radiation.

The merocyanine dyes defined by Formula I above are conveniently prepared, for example, by heating a mixture of (1) a heterocyclic compound of the formula:

(V)

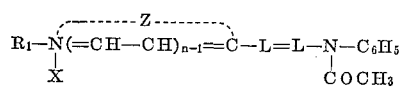

wherein n, R$_1$ and Z are as previously defined, and X represents an acid anion, e.g., chloride, bromide, iodide, perchlorate, thiocyanate, sulfamate, perchlorate, p-toluenesulfonate, methyl sulfate, etc., and (2) a thioxopiperidine compound of the formula:

(VI)

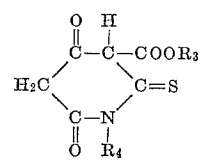

wherein $R_3$ and $R_4$ are as previously defined, in an aryl group, e.g., phenyl, tolyl, etc., in approximately equimolar proportions, in the presence of a basic condensing agent such as a trialkylamine, e.g., triethylamine, etc., piperidine, N-methylpiperidine, etc., in a solvent medium such as ethanol. The dyes are then separated from the reaction mixtures and, if desired, further purified by one or more recrystallizations from appropriate solvents such as an alkanol, e.g., methanol.

The benzylidene dyes of Formula II above are readily prepared by heating a mixture of (1) a thioxopiperidine compound of Formula VI above, and (2) an aldehyde of the formula:

(VII)

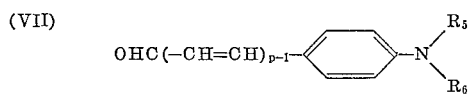

wherein $R_5$ and $R_6$ are as previously defined, and $p$ represents a positive integer of from 1 to 2, in approximately equimolar proportions, in a solvent medium such as ethanol. The solid which separated on cooling the reaction mixture is collected, dissolved in a hot mixture of ethanol and triethylamine, and p-toluenesulphonic acid monohydrate in ethanol is added. The mixture is chilled and the solid collected. After two such treatments, the dye is obtained in purified form.

The oxonol dyes of Formula III above are advantageously prepared by heating a mixture of (1) a thioxopiperidine compound of Formula VI above, and (2) diethoxymethyl acetate (to form the monomethine oxonol) or trimethoxypropene (to form the trimethine oxonol), in the proportions of 2 moles of (1) to 1 mole or more of (2), in the presence of a basic condensing agent such as a trialkylamine, e.g., triethylamine, etc., in a solvent medium such as pyridine. The mixture is cooled and the product precipitated by the addition of ether. The crude product is then dissolved in hot methanol, filtered, and p-toluenesulfonic acid monohydrate in methanol is added. The mixture is chilled and the solid collected. This procedure is repeated to obtain the purified dye.

The allopolar dyes of Formula IV above are conveniently prepared by a 2-stage process comprising in the first Step (A) heating a mixture of (1) a heterocyclic compound of the formula:

(VIII)

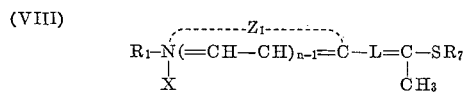

wherein $n$, $R_1$, X and $Z_1$ are as previously defined, and $R_7$ is a lower alkyl group, e.g., methyl, butyl, etc., and (2) a thioxopiperidine compound of Formula VI above, in approximately equimolar proportions, in the presence of a basic condensing agent such as a trialkylamine, e.g., triethylamine, etc., in a solvent medium such as ethanol. After cooling, acetic acid is added, and the mixture chilled. The solid which separates is collected. This intermediate dye compound is then reacted in Step (B) with (3) a heterocyclic compound of the formula:

(IX)

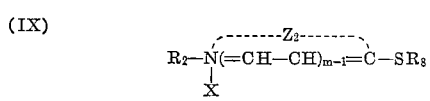

wherein $m$, $R_2$, X and $Z_2$ are as previously defined, $R_8$ represents an aryl group or a lower alkyl group, e.g., methyl, ethyl, propyl, or butyl and triethylamine in boiling dimethylformamide using approximately equimolar proportions of the intermediate of Step (A) and (3), followed by cooling the reaction mixture and precipitating the allopolar dye that is produced by the addition of ether to the cooled mixture. The purified dye is then obtained by one or more recrystallizations of the precipitate from appropriate solvents, e.g., from methanol.

The intermediate thioxopiperidines defined by Formula VI above are readily prepared by the general method of Worrall, J. Amer. Chem. Soc., 61, 2966, by reacting (1) a monosodium salt of a dialkylacetone dicarboxylate of the formula:

(X)

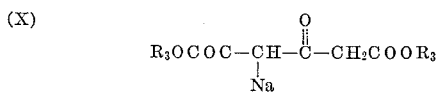

wherein $R_3$ is as previously defined, with (2) an arylisothiocyanate of the formula:

(XI) 

wherein $R_4$ is as defined, in approximately equimolar proportions, in a solvent such as dry ether.

In accordance with the preferred embodiment of the invention, novel and improved direct positive photographic silver halide emulsions are prepared by incorporating one or more of the oxonol dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Patent 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK–50 having the composition set forth below, when the emulsion is coated at a silver coverage of 50 mg. to 500 mg. per square foot.

DEVELOPER

N-methyl-p-aminophenol sulfate—2.5 g.
Sodium sulfite (anhydrous)—30.0 g.
Hydroquinone—2.5 g.
Sodium metaborate—10.0 g.
Potassium bromide—0.5 g.
Water to make—1.0 l.

The oxonol dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. patent application Ser. No. 448,467, filed Apr. 15, 1965, now Pat. No. 3,367,778. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

N-methyl-p-aminophenol sulfate—2.5 g.
Ascorbic acid—10.0 g.
Potassium metaborate—35.0 g.
Potassium bromide—1.0 g.
Water to 1 liter
pH—9.6

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, vol. XXVIII, January 1957, pp. 1 to 23 and January 1957, pp. 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The oxonol dyes of this invention are highly useful electron acceptors in high speed direct positive emulsions comprising fogged silver halide grains and a compound which accepts electrons, as described and claimed in Illingsworth U.S. patent application Ser. No. 619,936, filed Mar. 2, 1967, now Pat. No. 3,501,307 and titled "Photographic Reversal Materials Case C." The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halide employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 619,909, filed Mar. 2, 1967, now Pat. No. 3,501,306 and titled "Direct Positive Photographic Emulsions Case A." Such grains advantageously have a rather uniform diameter frequency distribution, as described and claimed in Illingsworth U.S. patent application Ser. No. 619,948, filed Mar. 2, 1967, now Pat. No. 3,501,305 and titled "Photographic Reversal Emulsions Case B." For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pp. 330–338. The fogged silver halide grains in these direct-positive photographic emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square of support.

In the preparation of the above direct positive photographic emulsions and negative photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Patents 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly useful are direct positive fogged emulsions in which the silver salt is a silver bromohalide comprising more than 50 mole percent bromide. Certain dyes of this invention are also useful in emulsions which contain color formers.

The novel emulsions of this invention may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote emulsion adhesion, to produce the novel photographic elements of the invention.

The invention is further illustrated by the following examples.

EXAMPLE 1

5-ethoxycarbonyl-3-[(3 - ethyl - 2 - benzoxazolinylidene) ethylidene]-2,4-dioxo-1-phenyl-6-thioxopiperidine

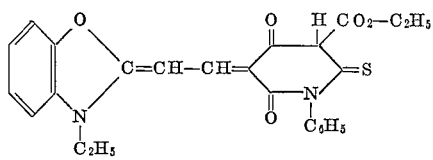

5-ethoxycarbonyl - 2,4 - dioxo-1-phenyl-6-thioxopiperidine (0.73 g., 1 mol.), 2-β-acetanilidovinyl-3-ethylbenzoxazolium iodide (1.09 g., 1 mol.) and triethylamine (0.7 ml., 1 mol.+10%) in ethanol (10 ml.) are heated at reflux for 1 minute. Acetic acid (1 ml.) is added, with stirring, and the mixture is chilled. The solid which separates is collected, dissolved in a mixture of hot methanol (20 ml.) and triethylamine (0.5 ml.). The solution is filtered, acetic acid (1 ml.) added, and the mixture chilled. The solid is collected and washed with methanol. After two such treatments, the yield of purified dye is 0.86 g. (74%), M.P. 267–270° C., dec.

The above prepared merocyanine dye is an excellent spectral sensitizer for negative type photographic silver halide emulsions as indicated by the following test procedure.

To a silver bromoiodide emulsion, containing 0.77 mole percent iodide of the type described by Trivelli and Smith, Phot. Journal, 79, 330 (1939), is added a solution of the above dye in a suitable solvent at a concentration of 0.08 g. of the dye per mole of silver. After digestion at 52° C. for 10 minutes, the emulsion is coated at a coverage of 432 mg. of silver per square foot on a cellulose acetate film support. A sample of the coating is exposed on an Eastman IB Sensitometer and to a wedge spectrograph, processed for 3 minutes in Kodak Developer D-19, which has the following composition:

N-Methyl-p-aminophenol sulfate—2.0 g.
Sodium sulfite (anhydrous)—90.0 g.
Hydroquinone—8.0 g.
Sodium carbonate (monohydrate)—52.5 g.
Potassium bromide—5.0 g.
Water to make—1.0 l.

then fixed, washed and dried.

The results obtained show that the above dye produces negative emulsions with a sensitivity range up to about 560 nm., with a maximum sensitivity at about 490 nm. This indicates that the merocyanine dyes of this invention as illustrated by the above dye are excellent spectral sensitizers for conventional negative type silver halide emulsions.

EXAMPLE 2

5 - ethoxycarbonyl-3-[(3 - ethyl-2-benzothiazolinylidene) ethylidene]-2,4-dioxo-1-phenyl-6-thioxopiperidine

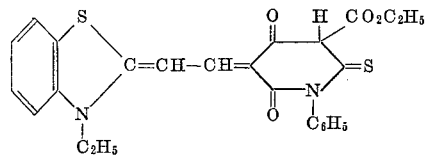

The above dye is prepared from 5-ethoxycarbonyl-2,4-dioxo-1-phenyl-6-thioxopiperidine (0.73 g., 1 mol.) and 2-β-acetanilidovinyl-3-ethylbenzothiazolium iodide (1.13 g., 1 mol.), in the same manner as that described for Example 1. The yield of purified dye is 0.90 g. (75%), M.P. 280–286° C. dec.

This merocyanine dye is photographically tested by the exact procedure described in above Example 1. The results show a sensitivity range up to about 590 nm., with a maximum sensitivity at 520 nm. Accordingly, this dye is an excellent spectral sensitizer for negative type silver halide emulsions.

In place of the 2-β-acetanilidovinyl-3-ethylbenzothiazolium iodide in above Example 2, there can be substituted an equivalent amount of any other of the intermediates defined by Formula V above for example, 2-β-acetanilidovinyl-3-alkyl (e.g., methyl, ethyl, propyl, butyl, decyl, etc.) benzoselenazolium salts (e.g., the chloride, bromide, iodide, perchlorate, p - toluenesulfonate, etc. salts); 2-β-acetanilidovinyl-3-ethyl-thiazolium p - toluenesulfonate; 2-β-acetanilidovinyl-2-quinolinium bromide; 2-β-acetanilidovinyl-1,3-dimethylbenzimidazolium methane sulfonate; 2-β-acetanilidovinyl - 1,3,3-trimethylindolinium chloride; or 2-acetanilidovinylpyridinium p-toluenesulfonate to give other merocyanine dyes embraced by Formula I above of the invention which have generally similar usefulness as spectral sensitizers for negative type silver halide emulsions. Also, the 5-ethoxycarbonyl-2,4-dioxo-1-phenyl-6-thioxopiperidine can be substituted by any other of the intermediates defined by Formula VI above, for example, any other 5-alkoxycarbonyl (e.g., methoxycarbonyl, ethoxycarbonyl, propoxycarbonyl, butoxycarbonyl, etc.)-2,4-dioxo-1-aryl (e.g., phenyl, tolyl, naphthyl, etc.)-6-thioxopiperidines, to give still other merocyanine dyes of the invention embraced by Formula I above that also have generally similar properties as spectral sensitizers for negative type silver halide emulsions.

EXAMPLE 3

3 - (p-dimethylaminobenzylidene) - 5 - ethoxycarbonyl-2, 4-dioxo-1-phenyl-6-thioxopiperidine

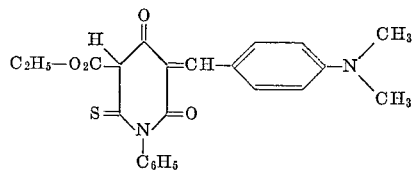

A mixture of 5-ethoxycarbonyl-2,4-dioxo-1-phenyl-6-thioxopiperidine (1.46 g., 1 mol.) and p-dimethylaminobenzaldehyde (0.75 g., 1 mol.) in ethanol (50 ml.) is heated to boiling, with constant stirring as much solid separated. The mixture is allowed to cool and the solid collected. The solid is dissolved in a hot mixture of ethanol (50 ml.) and triethylamine (1 ml.), filtered, and p-toluenesulphonic acid monohydrate (2 g.) in a little ethanol added. The mixture is chilled and the solid collected. After two such treatments, the yield of purified dye is 0.85 g. (45%) M.P. indefinite.

EXAMPLE 4

3 - (p - dimethylaminocinnamylidene)-5-ethoxycarbonyl-2,4-dioxo-1-phenyl-6-thioxopiperidine

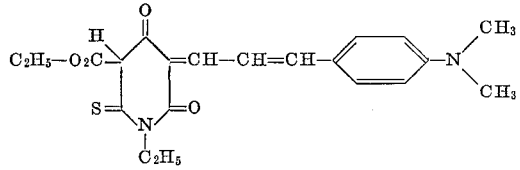

The above is prepared from 5-ethoxycarbonyl-2,4-dioxo-1-phenyl-6-thioxopiperidine (1.46 g., 1 mol.) and p-dimethylaminocinnamaldehyde (0.88 g., 1 mol.), in the same manner as that described for Example 3. The yield of purified dye is 1.13 g. (50%) M.P. indefinite.

The above dyes of Examples 3 and 4 illustrate the benzylidene type dyes of the invention. On photographic testing, they show usefulness primarily as filter and backing dyes in photographic element layers. They are easily removable in alkaline developers.

In place of the 5-ethoxycarbonyl-2,4-dioxo-1-phenyl-6-thioxopiperidine in above Examples 3 and 4, there can be substituted in each case an equivalent amount of any other of the intermediates defined by Formula VI above, for example, any other 5-alkoxycarbonyl (e.g., methoxycarbonyl, ethoxycarbonyl, propoxycarbonyl, butoxycarbonyl, etc.)-2,4-dioxo-1-aryl (e.g., phenyl, tolyl, naphthyl, etc.)-6-thioxopiperidines, to give other benzylidene type dyes embraced by Formula II above of the invention which have generally similar usefulness as readily removable filter and backing layers in photographic elements. Also, the p-dimethylaminobenzaldehyde and the p-dimethylaminocinnamaldehyde of Examples 3 and 4, respectively, can be substituted in each case by the corresponding p - diethylaminoaldehyde, p - dipropylaminoaldehyde, p - dibutylaminoaldehyde, p - diethylaminocinnamaldehyde, p-dipropylaminocinnamaldehyde, p-dibutylaminocinnamaldehyde, etc., to give still other benzylidene type dyes of the invention which also have generally similar utility as readily removable filter and backing layers in photographic elements.

EXAMPLE 5

Bis[5-ethoxycarbonyl-2,4-dioxo-1-phenyl-6-thioxopiperidine-(3)]monomethine oxonol

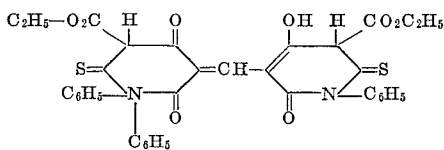

A mixture of 5-ethoxycarbonyl-2,4-dioxo-1-phenyl-6-thioxopiperidine (1.46 g., 2 mols.), diethoxymethyl acetate (1.21 g., 1 mol.+200%) and pyridine (10 ml.) is heated to boiling, and triethylamine (1.4 ml.) added. The mixture is allowed to cool and the product precipitated by the addition of excess ether. The crude product is dissolved in hot methanol (25 ml.), filtered, and p-toluenesulfonic acid monohydrate (2 g.) in a little methanol added. The mixture is chilled and the solid collected. This solid is dissolved in a hot mixture of methanol (25 ml.), triethylamine (1 ml.) added, filtered, and p-toluenesulfonic acid monohydate (2 g.) in methanol added. The mixture is chilled and the solid collected. The yield of purified dye is 0.68 g. (46%), M.P. 225–226° C., dec.

EXAMPLE 6

Bis[5-ethoxycarbonyl-2,4-dioxo-1-phenyl-6-thioxopiperidine-(3)]trimethine oxonol

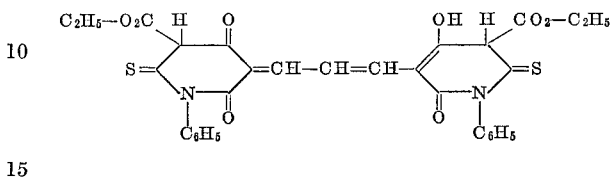

This compound is prepared and purified in the same manner as that described for Example 5, except that trimethoxypropene (1.0 g., 1 mol.+200%) is used in place of diethoxymethyl acetate. The yield of purified dye is 1.12 g. (73%), M.P. indefinite.

The above oxonol dyes of Examples 5 and 6 illustrate the preferred dye species of the invention. These dyes function as powerful electron acceptors and spectral sensitizers for direct positive photographic silver halide as shown by the following test procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye to be tested is then added to the above fogged emulsion in amount sufficient to give a concentration as indicated in Table 1 hereafter as grams of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D–19 developer (composition of which is given in above Example 1), then fixed, washed and dried. The results are listed in Table I hereinafter. Referring thereto, it will be seen that the dye of Example 5 has a maximum density in the unexposed areas of 1.46 and a minimum density in exposed areas of 0.07, a maximum sensitivity of 650 nm. and a relative speed of 229. The dye of Example 6 shows densities for the unexposed and exposed areas of 1.58 and 0.22, respectively, and a relative speed of 105. These results indicate that the dye compounds of the above examples are well suited to function as both electron acceptors and spectral sensitizers. They thus provide excellent quality direct positive photographic silver halide emulsions. Excellent magenta images are obtained when the color former 1-(2,4,6-trichlorophenyl) - 3,3' - (2'',4'' - di - t - amylphenoxyacetamido)benzimidazo-5-pyrazolone is incorporated in the emulsions of these examples, and the emulsions then coated on a support, exposed to a tungsten source through Wratten filter No. 61 and No. 16, and reversal processed as described in Graham et al. U.S. Pat. 3,-046,129, issued July 24, 1962, in Example (a) col. 27, lines 27 et seq. except that black-and-white (MQ) development is omitted, the color development is reduced to one minute and is conducted in total darkness until after fixing.

TABLE 1

| Example No. | Dye conc., g./mole silver | Relative clear speed | Density Maximum in unexposed areas | Density Minimum in exposed areas | Maximum sensitivity, nm. |
|---|---|---|---|---|---|
| 5 | 0.70 | 229 | 1.46 | .07 | 650 |
| 6 | 0.20 | 105 | 1.58 | .22 | Blue |

It will be evident from the foregoing description that the 5 - ethoxycarbonyl-2,4-dioxo-l-phenyl-6-thioxopiperidine in above Examples 5 and 6 can be substituted in each case with an equivalent amount of any other of the intermediates defined by Formula VI above, for example, any other 5-alkoxycarbonyl (e.g., methoxycarbonyl, ethoxycarbonyl, propoxycarbonyl, butoxycarbonyl, etc.)-2,4-dioxo-1-aryl (e.g., phenyl, tolyl, naphthyl, etc.)-6-thioxopiperidines, to give other oxonol dyes embraced by Formula III above of the invention which have generally similar properties as electron acceptors and spectral sensitizers for fogged direct positive photographic silver halide emulsions. Typical other oxonol dyes include, for example, bis[5-methoxycarbonyl-2,4-dioxo-1-phenyl-6-thioxopiperidine(3)]monomethine oxonol;
bis[5-butoxycarbonyl-2,4-dioxo-1-phenyl-6-thioxopiperidine (3)]monomethine oxonol;
bis[5-ethoxycarbonyl-2,4-dioxo-6-thioxo-1-p-tolypiperidine(3)] onomethine oxonol;
bis[5-methoxycarbonyl-2,4-dioxo-1-phenyl-6-thioxopiperidine(3)] trimethine oxonol;
bis[5-butoxycarbonyl-2,4-dioxo-1-phenyl-6-thioxopiperidine(3)]trimethine oxonol;
bis[5-ethoxycarbonyl-2,4-dioxo-6-thioxo-1-p-tolylpiperdine(3)]-trimethine oxonol;

and the like.

The following examples further illustrate the preparation of fogged, direct positive photographic emulsions and elements with the cyanine dyes of the invention.

EXAMPLE 7

To 9.0 pounds of a silver chloride gelatin emulsion containing an equivalent of 100 grams of silver nitrate is added 0.017 gram of bis[5-ethoxycarbonyl-2,4-dioxo-1- phenyl-6 - thioxopiperidine(3)]monomethine oxonol (Example 5). The emulsion is coated on a non-glossy paper support, and is flashed with white light to give a density of 1.2 when developed in the following developer, diluted 1 part to 2 parts of water:

N-Methyl-p-aminophenolsulfate—3.1 grams
Sodium sulfite, des.—45 grams
Hydroquinone—12 grams
Sodium carbonate, des.—67.5 grams
Potassium bromide—1.9 grams
Water to 1 liter The light fogged material can be exposed to an image with light modulated by a Wratten No. 15 filter to give a direct positive image. Generally similar results are obtained when the dye of Example 6 is used in place of the above dye.

EXAMPLE 8

Seven pounds of a silver chloride gelatin emulsion containing the equivalent of 100 g. of silver nitrate is heated to 40° C. and the pH is adjusted to 7.8. Eight cc. of full strength (40%) Formalin solution is added and the emulsion is held at 40° C. for 10 minutes. At the end of the holding period, the pH is adjusted to 6.0 and 0.125 g. of bis[5-ethoxycarbonyl-2,4-dioxo-1-phenyl-6- thioxopiperdine(3)]trimethine oxonol is added (Example 6). The emulsion is coated on a support and provides good direct positive images. Similar results are obtained when the dye of Example 5 is substituted for the above dye.

The following example illustrates the allopolar dye compounds of the invention.

EXAMPLE 9

3 - bis{[(3-ethyl-2-benzothiazolinylidene)methyl] methylene} - 5-ethoxycarbonyl - 2,4 - dioxo-1-phenyl-6-thioxopiperidine 5 - ethoxycarbonyl - 2,4-dioxo-1-phenyl-6-thioxopiperidine (2.91 g., 1 mol), 3-ethyl-2-(2-ethylthiopropenyl)-benzothiazolium ethylsulfate (3.89 g., 1 mol) and triethylamine (3 ml.) in ethanol (25 ml.) are heated at reflux for 15 minutes. After cooling acetic acid (3 ml.) is added, and the mixture chilled. The solid which separates, 5 - ethoxycarbonyl - 3-{{[2-(3-ethyl-2-benzothiazolinylidene)]-1-methyl}-ethylidene}-2,4-dioxo-1-phenyl - 6 - thioxopiperidine, is collected. This compound (0.99 g., 1 mol), 3-ethyl-2-phenylthiobenzothiazolium iodide (0.88 g., 1 mol.) and triethylamine (0.5 ml.) in dimethylformamide (10 ml.) are heated to boiling, then allowed to cool. The product is precipitated as an oil by the addition of excess ether. The oil is stirred with more ether until crystallization starts, then the ether is decanted. Crystallization of the crude material from methanol yields 0.27 g. (21%) of purified dye, M.P. 218–222° C., dec.

The above dye on photographic testing, shows utility primarily as a filter and backing dye in photographic element layers. It is easily removable in alkaline developers. The dye also shows supersensitizing properties when combined with various sensitizing cyanine dyes.

In place of the 3-ethyl-2-(2-ethylthiopropenyl)-benzothiazolium ethylsulfate in the above example, there can be substituted an equivalent amount of any other of the intermediates defined by Formula VIII above, for example, the corresponding 3-alkyl (3.g., methyl, ethyl, propyl, butyl, etc.)-2-(2-ethylthiopropenyl)-benzoxazolium salts (e.g., the chloride, bromide, iodide, perchlorate, p-toluenesulfonate, etc. salts), or the corresponding 3-alkyl (e.g., methyl, ethyl, propyl, butyl, etc.)-2-(2-ethylthiopropenyl) benzoselenazolium salts (e.g., the chloride, bromide iodide, perchlorate, p-toluenesulfonate, etc. salts).

The 3-ethyl-2-phenylthiobenzothiazolium iodide of the process of above Example 9 can also be substituted by an equivalent amount of any other of the intermediates defined by Formula IX above, for example, by the corresponding benzoxazolium salts (e.g., the chloride, bromide, iodide, perchlorate, p-toluenesulfonate, etc. salts), or the corresponding benzoselenazolium salts (e.g., the chloride, bromide, iodide, perchlorate, p-toluenesulfonate, etc. salts), and the like, to give other allopolar dyes of the invention defined by Formula IV above which have generally similar supersensitizing properties for photographic silver halide emulsions of the negative type. It will be evident from the preceding description that $Z_1$ and $Z_2$ of above mentioned Formulas VIII and IX can stand for the non-metallic atoms necessary to complete the same or different heterocyclic nuclei. Thus, the process of above Example 9 provides a convenient means for preparing both the symmetrical and the unsymmetrical allopolar dyes of the invention.

The intermediate compounds defined by Formula VI above are conveniently prepared by the process described in the following example.

EXAMPLE 10

5-ethoxycarbonyl-2,4-dioxo-1-phenyl-6-thioxopiperidine

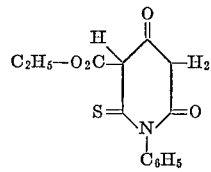

Diethyl acetonedicarboxylate (101.0 g., 1 mol.) is dissolved in 750 ml. of dry ether and sodium (11.5 g., 1 mol.) added gradually in small pieces. When the vigorous evolution of gas has subsided, the mixture is heated at a gentle reflux until solution is complete. The solution is allowed to cool, then phenylisothiocyanate (67.5 g., 1 mol.) is added in one lot. After standing overnight at room temperature, the ether is decanted and the sticky residue is dissolved in ice-water (500 ml.). The aqueous layer is separated and washed with ether (100 ml.). Concentrated hydrochloric acid (50 ml.) is added slowly, and pieces of ice are added at the same time to keep the mixture cool. The sticky material which separates is extracted with chloroform, the extract dried over magnesium sulfate, and the chloroform evaporated. The solid is well ground with ethanol (50 ml.), chilled, and the solid collected (44.1 g., M.P. 131–132°). After standing overnight at room temperature, the filtrate deposits a further 7.4 g. of product M.P. 130° C. The total yield is 51.5 g. (35%). This material is used without further purification in the synthesis of the dyes of the invention.

It will be apparent that the diethyl acetonedicarboxylate in the above example can be replaced with an equivalent of other closely related compounds such as dimethyl acetonedicarboxylate, di - n-butyl acetonedicarboxylate, etc. to give still other thioxopiperidines of the invention as defined by Formula VI above.

The photographic silver halide emulsions and the other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the photographic silver halide emulsion using any suitable technique, e.g., techniques of the type shown in Jelley et al., U.S. Pat. 2,322,027, issued June 15, 1943, Fierke et al., U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849, issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

I claim:

1. A photographic silver halide emulsion containing a methine dye having a 5-alkoxycarbonyl-2,4-dioxo-1-aryl-6-thioxopiperidine moiety.

2. A photographic element comprising a support having thereon at least one layer containing a photographic silver halide emulsion of claim 1.

3. A photographic silver halide emulsion containing at least one merocyanine dye selected from those comprising first and second 5- to 6-membered nitrogen containing heterocyclic nuclei joined together by a dimethine linkage; the first of said nuclei being 5-alkoxycarbonyl-2,4-dioxo-1-aryl-6-thioxopiperidine joined at the 3-carbon atom thereof to said linkage; and said second nucleus being of the type used in cyanine dyes joined at a carbon atom thereof to said linkage, to complete said merocyanine dye.

4. A photographic silver halide emulsion containing at least one benzylidene dye selected from those comprising first and second 5- to 6-membered nitrogen containing heterocyclic nuclei joined together by a linkage selected from the group consisting of a monomethine linkage and a trimethine linkage; the first of said nuclei being 5-alkoxycarbonyl-2,4-dioxo-1-aryl-6-thioxopiperidine joined at the 3-carbon atom thereof to said linkage; and said second nucleus being of the type used in cyanine dyes joined at a carbon atom to said linkage, to complete said benzylidene dye.

5. A photographic silver halide emulsion containing at least one oxonol dye selected from those comprising two 5-alkoxycarbonyl-2,4-dioxo-1-aryl - 6 - thioxopiperidine nuclei joined together at the 3-carbon atoms thereof by a linkage selected from the group consisting of a monomethine linkage and a trimethine linkage.

6. A photographic silver halide emulsion containing at least one allopolar dye selected from those comprising first, second and third 5- to 6-membered nitrogen containing heterocyclic nuclei joined together by a trimethine linkage; the said first and second nuclei being of the type used in cyanine dyes joined at carbon atoms thereof to the terminal carbon atoms of said linkage; and said third nucleus being 5-alkoxycarbonyl-2,4-dioxo-1-aryl-6-thioxopiperidine joined at the 3-carbon atom thereof to the meso carbon atom of said linkage, to complete said allopolar carbocyanine dye.

7. A photographic silver halide emulsion containing at least one polymethine dye selected from those having one of the following formulas:

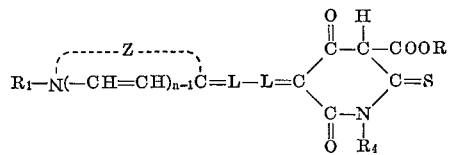

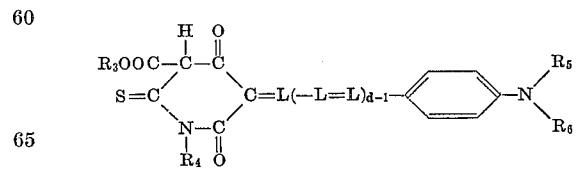

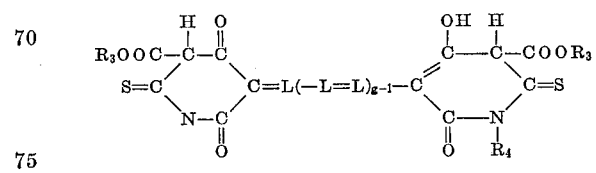

and

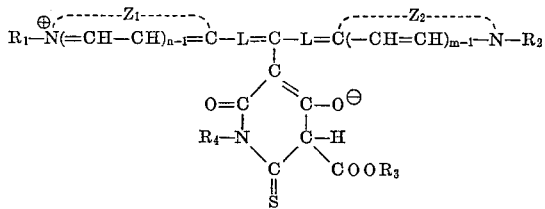

wherein $n$, $m$, $d$ and $g$ each represents a positive integer of from 1 to 2; L represents a methine linkage; $R_1$ and $R_2$ each represents a member selected from the group consisting of an alkyl group and an aryl group; $R_3$, $R_5$ and $R_6$ each represents an alkyl group; $R_4$ represents an aryl group; and Z, $Z_1$ and $Z_2$ each represents the non-metallic atoms necessary to complete a heterocyclic nucleus of the type used in cyanine dyes having from 5 to 6 atoms in the heterocyclic ring.

8. A photographic element comprising a support having thereon at least one layer containing a photographic silver halide emulsion of claim 7.

9. A photographic silver halide emulsion containing a polymethine dye selected from the group consisting of:

5-ethoxycarbonyl-3-[(3-ethyl-2-benzoxazolinylidene)-ethylidene]-2,4-dioxo-1-phenyl-6-thioxopiperidine,
5-ethoxycarbonyl-3-[(3-ethyl-2-benzothiazolinylidene)-ethylidene]-2,4-dioxo-1-phenyl-6-thioxopiperidine,
3-(p-dimethylaminobenzylidene)-5-ethoxycarbonyl-2,4-dioxo-1-phenyl-6-thioxopiperidine,
3-(p-dimethylaminocinnamylidene)-5-ethoxycarbonyl-2,4-dioxo-1-phenyl-6-thioxopiperidine,
bis[5-ethoxycarbonyl-2,4-dioxo-1-phenyl-6-thioxopiperidine(3)]monomethine oxonol,
bis[5-ethoxycarbonyl-2,4-dioxo-1-phenyl-6-thioxopiperidine(3)]-trimethine oxonol and
3-bis{[(3-ethyl-2-benzothiazolinylidene)-methyl]-methylene}-5-ethoxycarbonyl-2,4-dioxo-1-phenyl-6-thioxopiperidine.

10. A direct positive photographic silver halide emulsion containing at least one oxonol dye selected from those comprising two 5-alkoxycarbonyl-2,4-dioxo-1-aryl-6-thioxopiperidine nuclei joined together at the 3-carbon atoms thereof by a linkage selected from the group consisting of a monomethine linkage and a trimethine linkage.

11. A photographic element comprising a support having thereon at least one layer containing a direct positive emulsion of claim 10.

12. A direct positive photographic silver halide emulsion containing at least one oxonol dye selected from those represented by the formula:

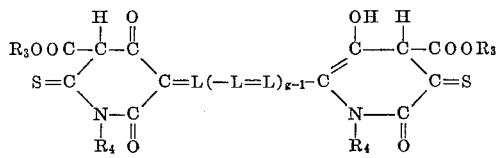

wherein $g$ represents a positive integer of from 1 to 2; L represents a methine linkage; $R_3$ represents an alkyl group; and $R_4$ represents an aryl group.

13. A direct positive emulsion in accordance with claim 12 in which the said silver halide is present in the form of fogged silver halide grains.

14. A direct positive emulsion in accordance with claim 12 in which the said silver halide is present in the form of reduction and gold fogged silver halide grains.

15. A direct positive emulsion in accordance with claim 12 containing a photographic color former.

16. A direct positive photographic emulsion in accordance with claim 12 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

potassium cyanide—50 mg.
acetic acid (glacial)—3.47 cc.
sodium acetate—11.49 g.
potassium bromide—119 mg.
water to 1 liter 17. A direct positive photographic emulsion in accordance with claim 12 which comprises fogged silver halide grains, at least 95%, by weight, of said grains having a diameter which is within about 40% of the mean grain diameter.

18. A direct positive emulsion in accordance with claim 12 containing an oxonol cyanine dye selected from the group consisting of bis[5 - ethoxycarbonyl-2,4-dioxo-1-phenyl-6 - thioxopiperidine(3)]monomethine oxonol and bis[5 - ethoxycarbonyl - 2,4 - dioxo - 1 - phenyl - 6-thioxopiperidine(3)]trimethine oxonol.

19. A photographic element comprising a support having thereon at least one layer containing a direct positive emulsion of claim 12.

20. A photographic element comprising a support having thereon at least one layer containing a direct positive emulsion of claim 17.

21. A photographic element comprising a support having thereon at least one layer containing a direct positive emulsion of claim 16.

22. A photographic silver halide emulsion containing at least one merocyanine dye selected from those comprising first and second 5- to 6-membered nitrogen containing heterocyclic nuclei joined together by a dimethine linkage; the first of said nuclei being 5-alkoxycarbonyl-2,4-dioxo-1-aryl-6-thioxopiperidine joined at the 3-carbon atom thereof to said linkage; and said second nucleus being selected from the group consisting of thiazole, oxazole, selenazole, thiazoline, pyridine, quinoline and 3,3-dialkylindolenine.

References Cited

UNITED STATES PATENTS

| 2,514,649 | 7/1950 | Knott | 96—102 X |
| 2,691,581 | 10/1954 | Knott | 96—102 |
| 3,440,053 | 4/1969 | Holtzclaw et al. | 96—106 X |

WILLIAM D. MARTIN, Primary Examiner

T. G. DAVIS, Assistant Examiner

U.S. Cl. X.R.

96—87, 94, 127, 143